United States Patent
Senarath et al.

(10) Patent No.: US 8,144,597 B2
(45) Date of Patent: Mar. 27, 2012

(54) PATH SELECTION FOR A WIRELESS SYSTEM WITH RELAYS

(75) Inventors: Nimal Gamini Senarath, Nepean (CA); Derek Yu, Kanata (CA); Hang Zhang, Nepean (CA); Israfil Bahceci, Nepean (CA); Peiying Zhu, Kanata (CA); Wen Tong, Ottawa (CA)

(73) Assignee: Rockstar Bidco L.P., New York, NY (US)

( * ) Notice: Subject to any disclaimer, the term of this patent is extended or adjusted under 35 U.S.C. 154(b) by 241 days.

(21) Appl. No.: 12/347,002

(22) Filed: Dec. 31, 2008

(65) Prior Publication Data

US 2009/0185492 A1    Jul. 23, 2009

Related U.S. Application Data

(60) Provisional application No. 61/022,652, filed on Jan. 22, 2008.

(51) Int. Cl.
*G01R 31/08* (2006.01)
(52) U.S. Cl. .................................. 370/238; 370/352
(58) Field of Classification Search .............. 370/238, 370/352; 455/13.1, 225, 446
See application file for complete search history.

(56) References Cited

U.S. PATENT DOCUMENTS

| | | | |
|---|---|---|---|
| 6,954,435 B2 | 10/2005 | Billhartz et al. | |
| 2002/0176361 A1* | 11/2002 | Wu et al. ................ | 370/231 |
| 2004/0185780 A1 | 9/2004 | Coupechoux et al. | |
| 2005/0094628 A1* | 5/2005 | Ngamwongwattana et al. ................ | 370/352 |
| 2006/0013177 A1 | 1/2006 | Saito | |
| 2007/0066315 A1 | 3/2007 | Kado | |
| 2007/0097945 A1* | 5/2007 | Wang et al. ................ | 370/349 |
| 2008/0084856 A1* | 4/2008 | Ramachandran ........... | 370/342 |
| 2009/0010166 A1* | 1/2009 | Trac et al. ................ | 370/235 |

OTHER PUBLICATIONS

International Search Report and Written Opinion dated Mar. 20, 2009 for International Application No. PCT/CA2008/002302, International Filing Date Dec. 31, 2008 (11 pages).
European Search Report dated Sep. 5, 2011 for European Regional Phase Application No. 08871273.2-1525 based from International Application No. PCT/CA2008/002302; International Filing date Dec. 31, 2008 consisting of 3 pages.
Wang et al., "An Effective Path Selection Metric for IEEE 802.16-based Multi-hop Relay Networks," Computers and Communications (2007), ISCC 2007, IEEE Syposium on IEEE PI (Jul. 11, 2007), pp. 1051-1056, XP031159826, ISBN: 978-1-4244-1520-5.
Sharma et al., "Delay and Capacity Trade-Offs in Mobile Ad Hoc Networks: A Global Perspective", IEEE/ACM Transactions on Networking, IEEE/ACM, New York, NY (US), vol. 15(5) (Oct. 1, 2007), pp. 981-992, XP011194042, ISSN: 1063-6692, DOI: 10.1109/TNET.2007.905154.

* cited by examiner

*Primary Examiner* — Kevin C Harper
*Assistant Examiner* — Sai-Ming Chan
(74) *Attorney, Agent, or Firm* — Christopher & Weisberg, P.A.

(57) ABSTRACT

A method selects a path for forwarding a data packet in a wireless communication system. A system capacity versus delay impact curve is calculated for a direct path to mobile station. The direct path has a capacity cost based on communication quality of a direct link between a base station and the mobile station. This curve is shifted by a predetermined time corresponding to an additional delay over a relay path to produce a projected capacity curve for the relay path having a second capacity cost determined according to a combined measure of signal quality of multiple links in the relay path. The second capacity cost is multiplied by a capacity cost ratio to produce a relay capacity curve. The direct path or the relay path is selected based on a comparison of the system capacity versus delay impact curve and the relay capacity curve according to a QoS requirement.

19 Claims, 7 Drawing Sheets

PATH SELECTION FOR A WIRELESS SYSTEM WITH RELAYS

CROSS-REFERENCE TO RELATED APPLICATION

This application is related to and claims priority to U.S. Provisional Application Ser. No. 61/022,652, filed Jan. 22, 2008, entitled PATH SELECTION FOR A WIRELESS SYSTEM WITH RELAYS, the entirety of which is incorporated herein by reference.

STATEMENT REGARDING FEDERALLY SPONSORED RESEARCH OR DEVELOPMENT n/a

FIELD OF THE INVENTION

The present invention relates generally to a method and system for path selection and routing and more specifically to a method and system for path selection for a wireless communication system having relays.

BACKGROUND OF THE INVENTION

When relays are employed in wireless systems, an end user's data and control signals should be communicated with a base station. When a mobile station has multiple path options due to the availability of relaying stations, communication can be achieved via the direct path between a base station and a mobile station, or via a relay path involving one or more relays between a base station and a mobile station. The path taken by the end user's data and control signals can affect the performance of the wireless system. The problem of determining which path that end user's data and control signals should take is referred to as the path selection problem.

Proposals to the Institute of Electrical and Electronics Engineers ("IEEE") standard 802.16j, submitted prior to the present invention, suggest including the selection of the path based on the overall capacity impact. For example, if there are two hops and each relay link can support equal data rates, for delay tolerant services, it is good to switch to the relay link only if the relay hops can support at least twice the data rate of the direct link to the base station.

However, these proposals do not take into consideration other factors that may influence the actual performance of the system and may incorrectly bias the path selection in favor of one path over another. For example, for certain classes of data and/or services, additional delay may not be tolerated and a direct path may be the only viable choice.

Therefore, what is needed is a system and method for selecting a path for routing data packets in a wireless communication system having relays which considers data and service parameters in making the selection.

SUMMARY OF THE INVENTION

The present invention advantageously provides a method, apparatus and system for routing data packets in a communication system when the communication system includes at least one relay station. Data requirements and system parameters, such as required data rate, type of service, user priority, mobility, system loading, fairness, system loading, added delay and effective data rate may be considered when selecting a data path.

In accordance with one aspect of the present invention, a method is provided for selecting a path for forwarding data packets in a communication system. The communication system includes at least one base station, at least one relay station and at least one mobile station. A system capacity versus delay impact curve is calculated for a direct path to a mobile station. The direct path has a first capacity cost determined according to a communication quality of a direct link between a base station and the mobile station. The system capacity versus delay impact curve is shifted a predetermined time to produce a projected capacity curve for a relay path. The predetermined time delay corresponds to an additional delay over the relay path. The relay path includes the at least one relay station and has a second capacity cost determined according to a combined measure of signal quality of multiple links in the relay path. The second capacity cost is multiplied by a capacity cost ratio to produce a relay capacity curve. Either the direct path or the relay path is selected for forwarding the data packet. The path selection is based a comparison of the system capacity versus delay impact curve and the relay capacity curve at a point in the curves corresponding to a quality of service requirement of the data packet.

In accordance with another aspect of the present invention, an apparatus for selecting a path for forwarding data packets in a wireless communication system includes a path selector. The communication system includes at least one base station, at least one relay station and at least one mobile station. The path selector is operable to calculate a system capacity versus delay impact curve for a direct path to a mobile station. The direct path has a first capacity cost determined according to a communication quality of a direct link between a base station and the mobile station. The path selector shifts the system capacity versus delay impact curve a predetermined time to produce a projected capacity curve for a relay path. The predetermined time delay corresponding to an additional delay over the relay path. The relay path includes the at least one relay station and has a second capacity cost determined according to a combined measure of signal quality of multiple links in the relay path. The path selector further multiplies the second capacity cost by a capacity cost ratio to produce a relay capacity curve and selects one of the direct path and the relay path for forwarding the data packet. The path selection is based on a comparison of the system capacity versus delay impact curve and the relay capacity curve at a point in the curves corresponding to a quality of service requirement of the data packet.

In accordance with yet another aspect of the present invention, a wireless communication system includes at least one base station, at least one mobile station and at least one relay station. The at least one relay station is communicatively coupled to the at least one base station. The at least one mobile station is communicatively coupled to the at least one base station and the at least one relay station. The at least one mobile station is operable to communicate with the at least one base station through at least two paths. One path is selected for forwarding a data packet based on a delay requirement of a service flow or the data packet.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Before describing in detail exemplary embodiments that are in accordance with the present invention, it is noted that the embodiments reside primarily in combinations of apparatus components and processing steps related to implementing a system and method for selection a routing path for data packets in a wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for selecting a path for routing data packets that enhances the performance of a wireless communication system which employs at least one relay station. Performance enhancement may be any one or combination of enhancements to the performance of a wireless system, such as, for example, capacity enhancement, coverage enhancement, mobility enhancement, load balancing situations, etc.

If a service is delay sensitive, switching a mobile station from a direct path to a route having a relay station, such as a two hop system, even if each hop can support more than double the data rate, may be disadvantageous. This need has not been identified in the related art, and no solutions have been provided prior to the present application.

Additionally, if a mobile station has to send or receive data or messages with two different Quality of Service ("QoS") requirements, no solution has been available to do these communications using different paths. In other words, all data would go through the same path. Embodiments of the present invention enable dynamic, semi-static, and static path selection, as well as selecting between various kinds of path selection.

Figure 1:
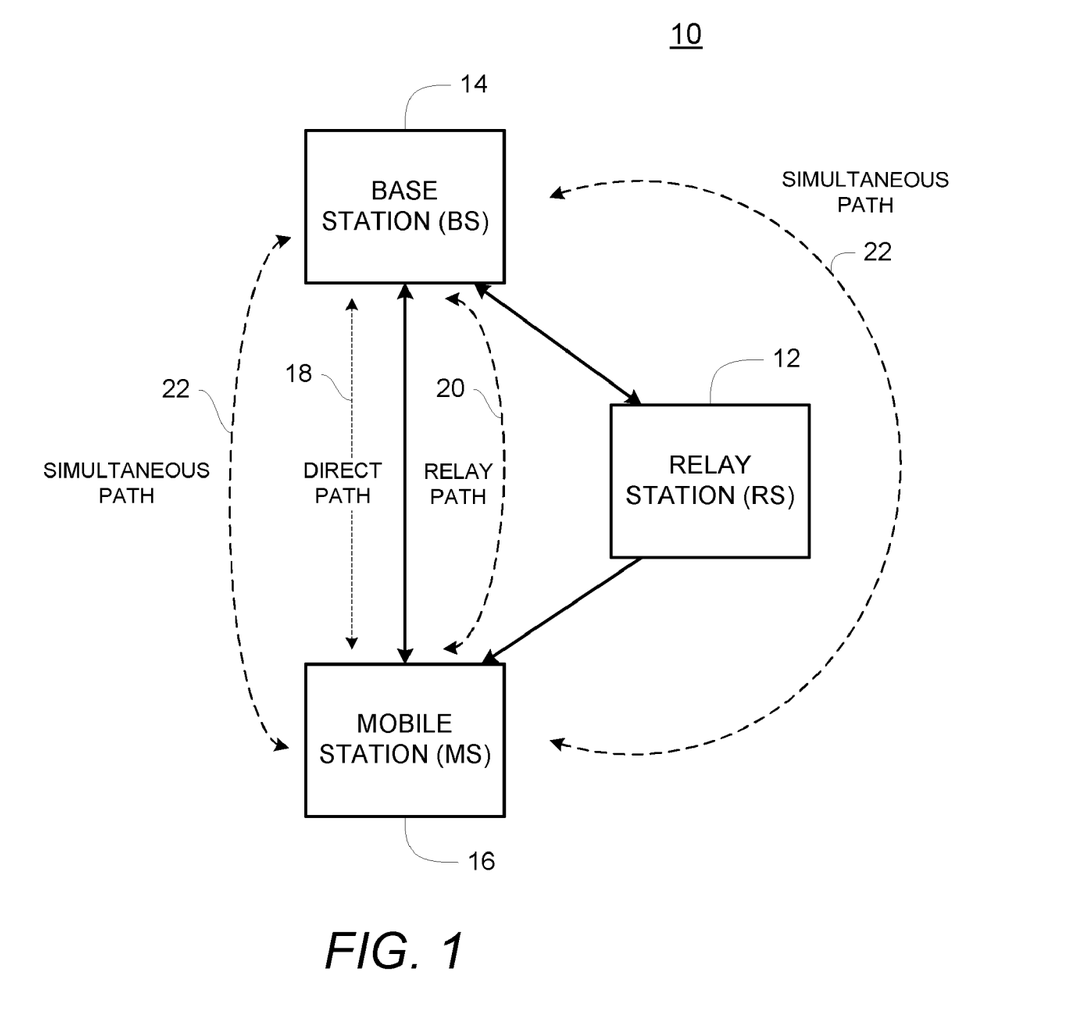
FIG. 1 is a block diagram of an exemplary wireless communication system employing at least one relay, the system constructed in accordance with the principles of the present invention.

Referring now to the drawing figures in which like reference designators refer to like elements, there is shown in FIG. 1 an exemplary wireless communication system 10 which employs at least one relay station 12, the wireless system provided in accordance with embodiments of the present application. The wireless communication system 10 includes at least one base station 14, at least one relay station 12, and at least one mobile station 16. The mobile station 16 may be a wireless communication device such as a cellular phone, a smart phone, a personal digital assistant ("PDA"), a laptop computer, a desktop computer, an electronic book reader, or any other device commonly receiving data packets through the base station 14. Although not shown, base station 14 communicates with other base stations 14 and other external networks via a backbone network.

Figure 2:
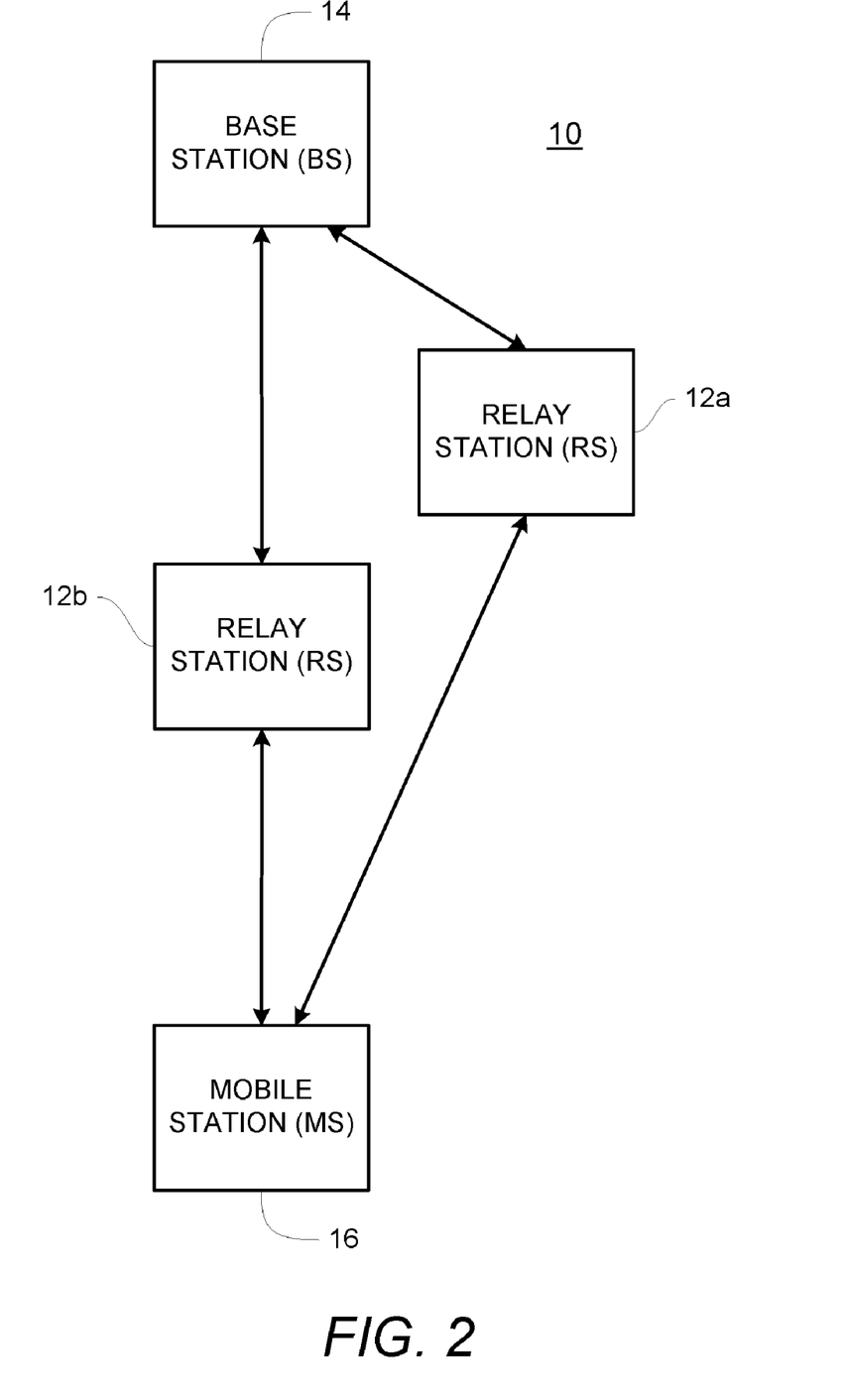
FIG. 2 is a block diagram of an alternative wireless communication system employing at least one relay, the system constructed in accordance with the principles of the present invention.
Figure 3:
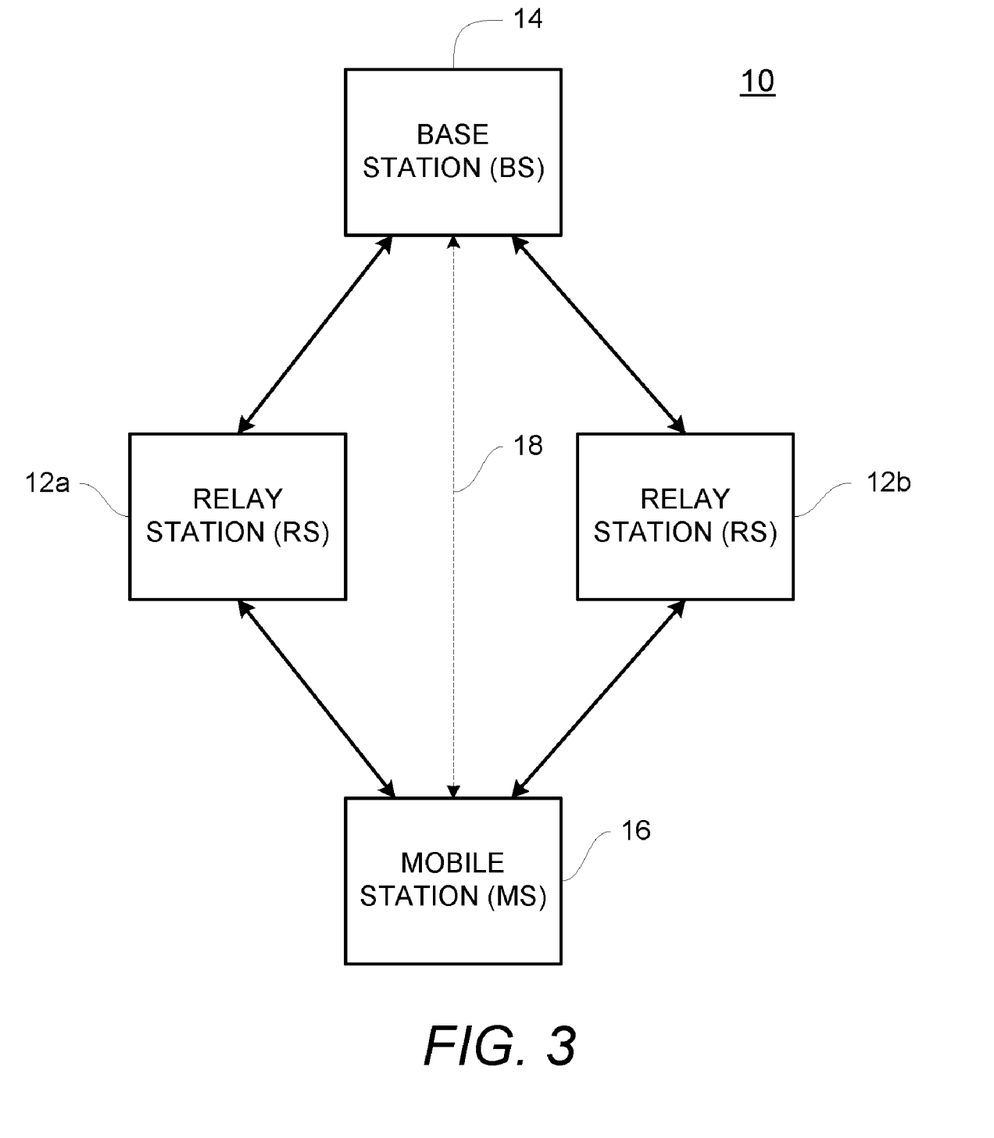
FIG. 3 is a block diagram of yet another alternative wireless communication system employing at least one relay, the system constructed in accordance with the principles of the present invention.

Several path options exist between base station 14 and mobile station 16. First, direct path 18 involves base station 14 and mobile station 16. Second, relay path 20 involves base station 14, one or more relay stations 12, and mobile station 16. Third, simultaneous path 22 includes using direct path 18 simultaneously with relay path 20. FIGS. 2 and 3 provide exemplary block diagrams for other exemplary wireless communication systems which employ more than one relay 12. In FIG. 2, no direct path exists between the base station 14 and the mobile station 16; thus, all traffic between the base station 14 and the mobile station 16 is routed through one of the two relay stations 12a, 12b. In FIG. 3, the path options include a direct route 18 between the base station 14 and the mobile station 16, as well as alternate routes through one of the two relay stations 12a, 12b.

In one embodiment of the present invention, one path is selected using criteria other than or in addition to the overall capacity impact, and all communications happen in the path selected. However, in another embodiment, the impact of the path to the capacity, throughput and delay performance is determined to depend on the service requirement. For example, the path through two relays can incur more delay than a direct path to a mobile station, if available. Therefore, if a mobile station 16 has multiple path options, for example, the direct path 18 to the base station 14, or to connect via a path 20 using a single relay station 12, or connect to both the mobile station 16 and the relay station 12 simultaneously via path 22, this decision can be advantageously made based on the QoS requirements of the service as well.

When a signal goes through the relay path 20 there can be more delay than the direct path 18. Therefore, for example, if a mobile station 16 initiated a voice service, the additional delay would impact the performance. The impact of delay may increase if the delay in a wireline section of the path is high and close to the tolerable limits, such that the delay budget over wireless is very small. In this case, even a small delay in the wireless network may impact the performance significantly.

In an alternative embodiment, different services are served via different paths as required so that the QoS of the service is taken into account, i.e., per service based selection. In addition, in another alternative embodiment, a technique is provided to select the best path based on the service requirements and capacity and coverage impact. When switching, path selection may be accomplished in a dynamic manner when multiple QoS data streams are present or in a static manner to fit the most important data/traffic service. The decision to switch may be made in a dynamic manner or static manner based on the delay requirements of the individual packet or overall delay requirement of the service. In addition, if a mobile station 16 has to send or receive data or messages with multiple QoS requirements, it is advantageous to send the related data through the optimal path for each service, e.g., data or message, which means for the same mobile station 16 there can be multiple paths selected for communication.

In another alternative embodiment, the path is to be selected based on delay and/or QoS of the services in addition to the capacity, coverage, and individual access station loading. The path may be selected on a per service basis for a given mobile station 16 in a dynamic manner, whereby different data streams follow different paths. Alternatively, this switching may be done based on the importance of the data stream of the mobile station 16. A way to take into account the delay impact on the capacity cost, and therefore the impact on overall cost function, is also provided with an example scheme.

In yet another alternative embodiment, a path is selected based on the QoS of service in addition to the resource cost, i.e., resource usage per data unit, of an individual path. The path selection may allow delay tolerant services to use the path with minimum resource cost. Additionally, as delay sensitive services experience a higher resource cost when using relays due to the added delay of the relay, the resource cost due to additional delay is compared with the resource cost reduction due to the increased data rate, i.e., additional boost in system capacity. A method to select the best path considers the resource cost due to additional packet delay. The path selection may be dynamic, semi-static, or static.

Figure 4:
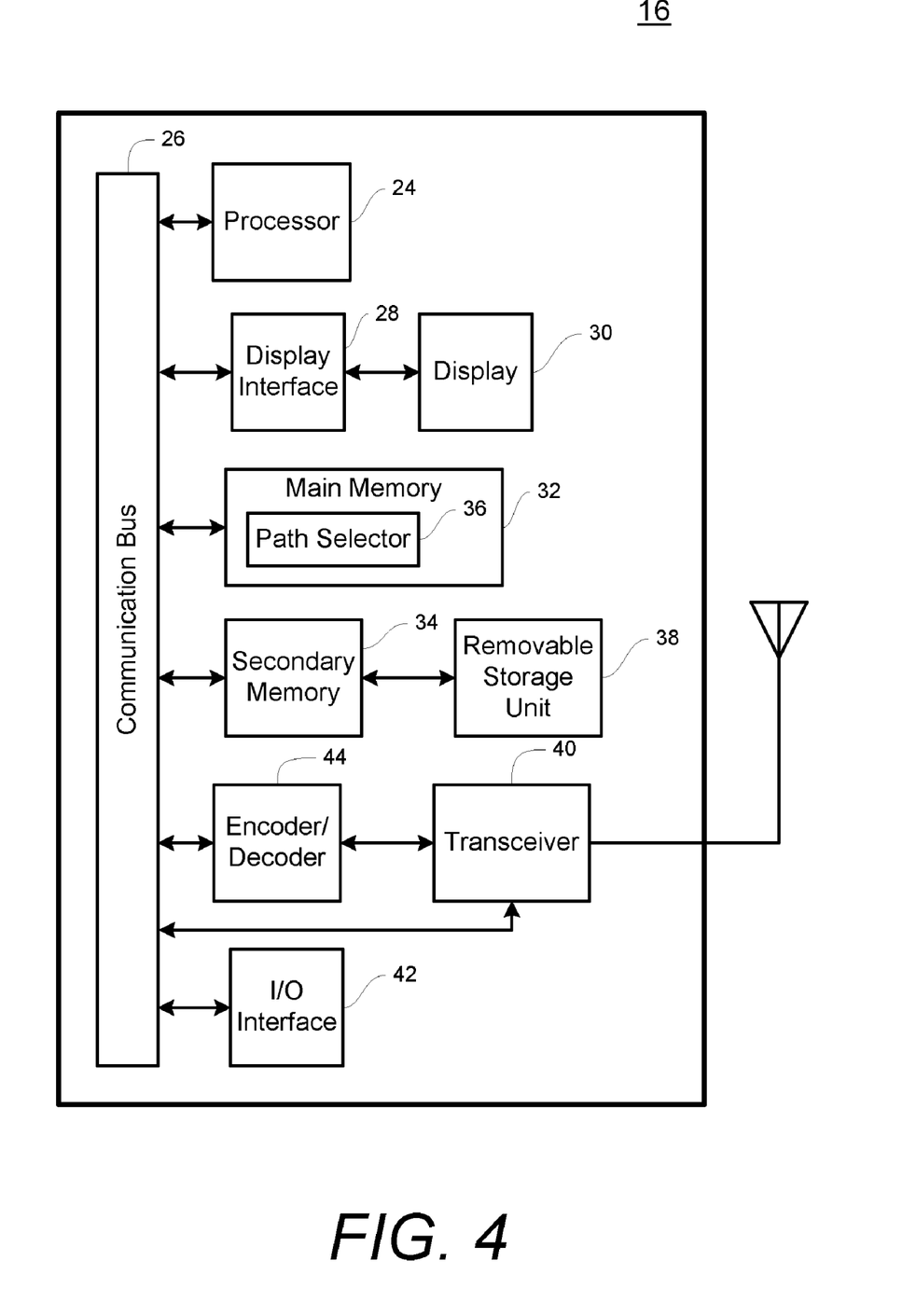
FIG. 4 is a block diagram of an exemplary mobile station for use in a wireless communication system constructed in accordance with the principles of the present invention.

Referring now to FIG. 4, an exemplary block diagram of mobile station 16 useful for implementing an embodiment of the present invention is provided. Mobile station 16, in an exemplary system 10, includes one or more processors, such as processor 24. The processor 24 is connected to a communication infrastructure 26, e.g., a communications bus, crossbar interconnect, network, etc. Mobile stations 16 can optionally include or share a display interface 28 that forwards graphics, text, and other data from the communication infrastructure 26 for display on a display unit 30. The mobile station 16 also includes a main memory 32, preferably random access memory ("RAM"), and may also include a secondary memory 34. Although most often implemented as part of a base station 14, the main memory 32 may include a path selector 36 for determining a desired path for routing data packets through the system 10. The path selector 36 is discussed in greater detail below.

The secondary memory 34 may include, for example, a hard disk drive and/or a removable storage drive, representing a floppy disk drive, a magnetic tape drive, an optical disk drive, etc. The removable storage drive reads from and/or writes to a removable storage unit 38 in a manner well known to those having ordinary skill in the art. Removable storage unit 38, represents, for example, a floppy disk, magnetic tape, optical disk, etc. which is read by and written to by secondary memory 34. As will be appreciated, the removable storage unit 38 includes a computer usable storage medium having stored therein computer software and/or data.

In alternative embodiments, the secondary memory 34 may include other similar means for allowing computer programs or other instructions to be loaded into the computer system. Such means may include, for example, a removable storage unit 38 and an interface (not shown). Examples of such may include a program cartridge and cartridge interface (such as that found in video game devices), a removable memory chip (such as an EPROM, EEPROM or PROM) and associated socket, and other removable storage units 38 and interfaces which allow software and data to be transferred from the removable storage unit 38 to the mobile station 16.

In this document, the terms "computer program medium," "computer usable medium," and "computer readable medium" are used to generally refer to media such as but not limited to main memory 32, secondary memory 34, removable storage unit 38, a hard disk installed in hard disk drive, etc. These computer program products are means for providing software to the mobile station 16. The computer readable medium allows the mobile station 16 to read data, instructions, messages or message packets, and other computer readable information from the computer readable medium. The computer readable medium, for example, may include non-volatile memory, such as floppy, ROM, flash memory, disk drive memory, CD-ROM, and other permanent storage. It is useful, for example, for transporting information, such as data and computer instructions, between other devices within system 10.

Computer programs (also called computer control logic) are stored in main memory 32 and/or secondary memory 34. Computer programs may also be received via a transceiver 40. Such computer programs, when executed, enable the mobile station 16 to perform the features of the present invention as discussed herein. In particular, the computer programs, when executed, enable the processor 24 to perform the features of the corresponding mobile station 16. Accordingly, such computer programs represent controllers of the corresponding device.

Mobile station 16 may also include an Input/Output ("I/O") interface 42. I/O interface 42 allows mobile station 16 to present information to and accept data from a user through a variety of input/output devices, e.g., keyboard, mouse, touch screen, buttons, microphone, speaker, USB devices, etc. Information transferred via I/O interface 42 are in the form of signals which may be, for example, electronic, electromagnetic, optical, or other signals capable of being received by I/O interface 42.

The transceiver 40 transmits and receives wireless communication signals encoded in accordance with defined communication protocol standards, including but not limited to, Code division multiple access ("CDMA"), Time division multiple access ("TDMA"), Global System for Mobile Communications ("GSM"), Enhanced Data rates for GSM Evolution ("EDGE"), Evolution-Data Optimized ("EVDO"), Third Generation ("3G"), Long-term Evolution ("LTE"), Wi-Fi, WiMAX, etc. Transceiver 40 is electrically connected to an encoder/decoder 44 which decodes and encodes data packets according to a predefined encryption scheme.

Figure 5:
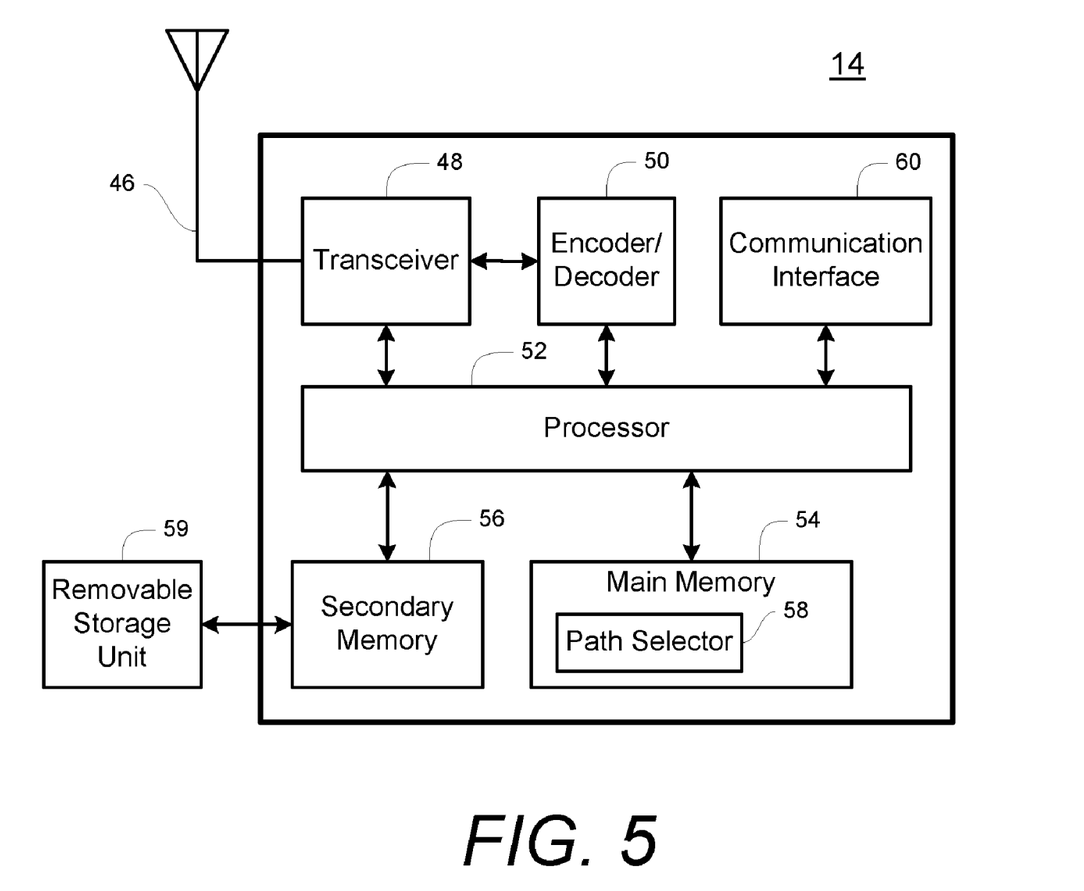
FIG. 5 is a block diagram of an exemplary base station of a wireless communication system constructed in accordance with the principles of the present invention.

Referring now to FIG. 5, a block diagram of an exemplary base station 14 is provided. It should be noted that while FIG. 5 details only the features relevant to the present invention, other features and functions of a typical base station 14 may be included, as is well-known to those of ordinary skill in the art.

Base station 14 receives and transmits wireless communication signals encoded in accordance with defined communication protocol standards via an antenna 46 coupled to a transceiver 48. The transceiver 48 is coupled to an encoder/decoder 50 which encrypts raw data packets prior to transmission and decrypts received data packets for interpretation by a processor 52.

The processor 52 controls the operation of the base station 14 and the flow of data within the base station 14 and controls the execution of the functions described herein. The base station 14 also includes a main memory 54, preferably random access memory ("RAM"), and may also include a secondary memory 56. The main memory 54 includes a path selector 58 for determining a desired path for routing data through the system 10.

The secondary memory 56 may include, for example, a hard disk drive and/or a removable storage drive, representing a floppy disk drive, a magnetic tape drive, an optical disk drive, etc. The removable storage drive reads from and/or writes to a removable storage unit 59 in a manner well known to those having ordinary skill in the art. Removable storage unit 59, represents, for example, a floppy disk, magnetic tape, optical disk, etc. which is read by and written to by secondary memory 56. As will be appreciated, the removable storage unit 59 includes a computer usable storage medium having stored therein computer software and/or data.

The processor 52 is further electrically connected to a communication interface 60. Communication interface 60 allows software and data to be transferred between the base station 14 and external devices, including a public-switched telephone network ("PSTN"), Internet, etc. (not shown). Examples of communication interface 60 may include a modem, a network interface (such as an Ethernet card), a communications port, a PCMCIA slot and card, etc. Software and data transferred via communication interface 60 are in the form of signals which may be, for example, electronic, electromagnetic, optical, or other signals capable of being received by communication interface 60.

Figure 6:
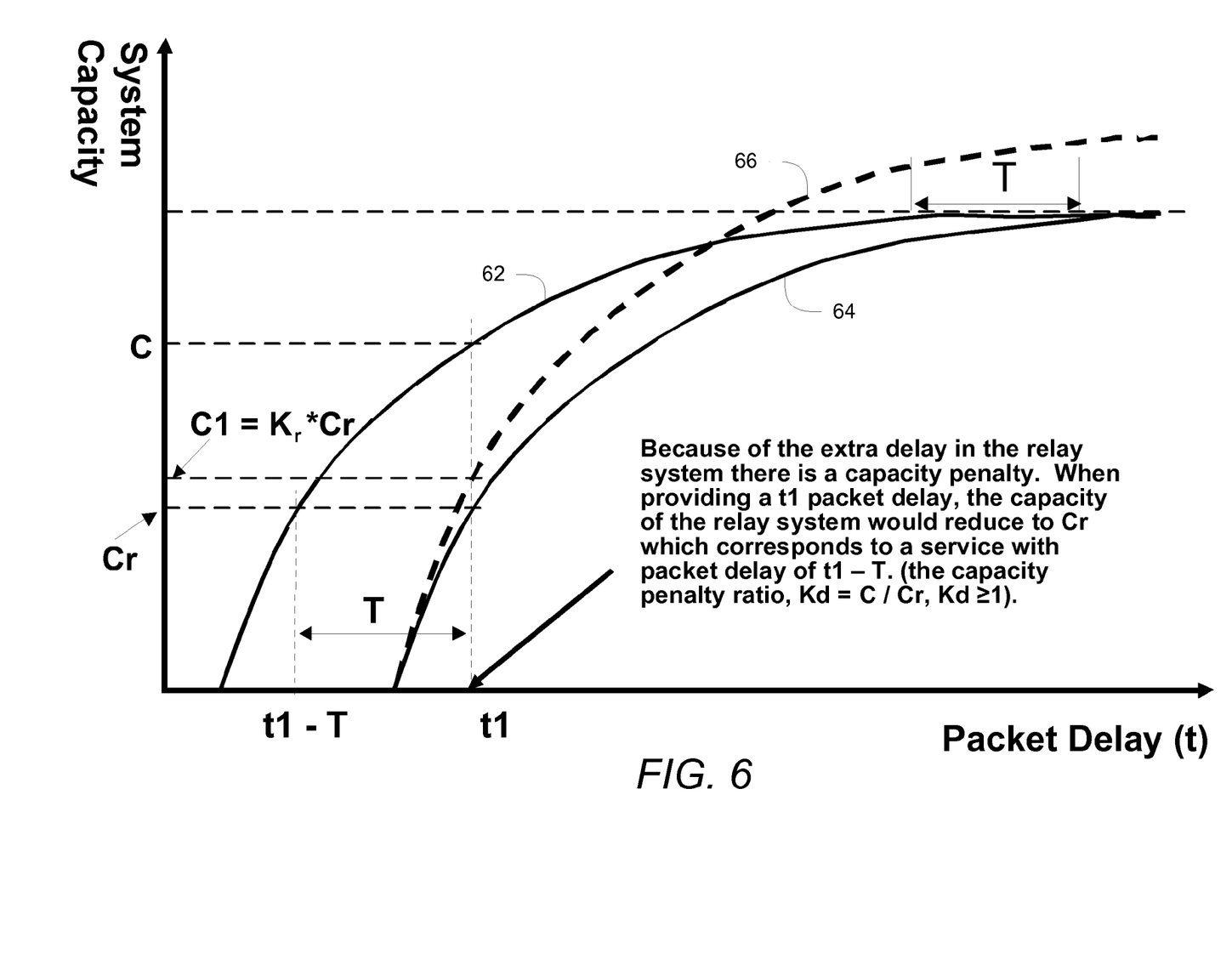
FIG. 6 is a graph illustrating the relationship between system capacity and packet delay (t), constructed in accordance with embodiments of the present invention.

Referring now to FIG. 6, a graph is provided which illustrates the relationship between System Capacity and Packet Delay (t) for the case where two paths for routing data exist: direct path 18 and relay path 20, as shown in FIG. 1. Assuming for a given mobile, $K_1$ and $K_2$ are resource units per data unit, i.e., resource cost, for direct and relay paths respectively. The capacity cost ratio, $K_r$, of resource cost gain of relay path relative to the direct path is shown by the relationship $K_r=K_2/K_1$. For example, if the relay path needs two time slots and uses the same data rate, i.e. modulation and coding scheme ("MCS"), then $K_r=2$ neglecting additional overhead. If the relay path data rate is doubled and use two time slots, i.e., higher MCS, $K_r=1$. If the system capacity is the only criterion to be used for optimization, then the path decision can be described as, if $K_r<1$ use relay path; else, use direct path.

If packet delay impact is also taken into consideration, then assume relay path incurs T additional delay for all connections. This example is true if there is no variable queuing/scheduling delay involved in the relay, e.g., in centralized store and forward type of relays. In the case of variable delay, the estimated average additional delay at the relay for a particular type data may be assessed.

Figure 7:
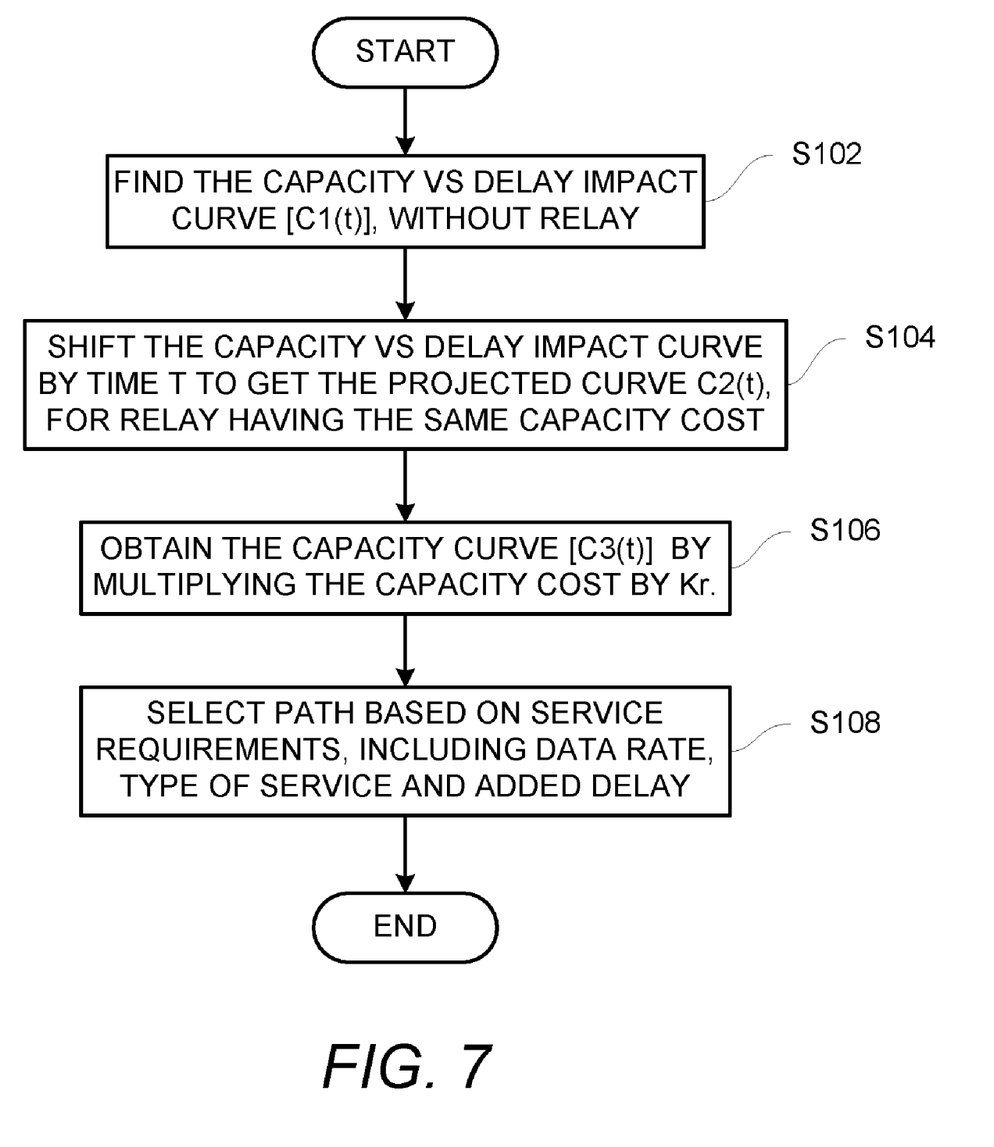
FIG. 7 is a flowchart of an exemplary path selection process performed according to the principles of the present invention example of intermediate indexing.

Referring now to FIG. 7, an exemplary operational flowchart is provided that describes steps performed by a path selector 36, 58 for selecting a path for routing data packets in a wireless communication system having relays. The process allows different paths to be selected for individual data packets for a variety of scenarios. For example, control packets and data packets may have different delay requirements and different application packets may have different delay requirements. Additionally, the uplink ("UL") and downlink ("DL") may have different delay requirements and therefore choose different paths.

The process begins by finding the capacity vs delay impact curve without relay (step S102), i.e., C1(t) curve 62 in FIG. 6. The capacity vs delay impact curve without relay 62 may be found, for example, using simulations. The capacity vs delay impact curve without relay 62 is shifted by time, T (step S104), to get the projected curve 64, C2(t), where C2(t)=C1(t−T), for relay having the same capacity cost, i.e., $K_r=1$. Depending on the mobile, the normalized capacity cost for relay path may be higher or lower than 1. For such a mobile, the capacity curve 66, C3(t), where C3(t)=Kr*C2(t), can be obtained by multiplying C2(t) by Kr (step S106).

A path is selected based on the service requirements, including but not limited to, the required data rate, type of service, added delay, etc. (step S108). However, when other factors such as system loading and fairness are to be taken into consideration, these service requirements are used not to select the path, but to bias the decision appropriately towards or against selecting the path. For example, higher loading in the relay path may completely prohibit the selection of a path although that path is more advantageous in terms of resources and performance. On the other hand, due to the loading changes, a particular service may be moved to the direct path to admit a different favorable service. Because of the extra delay in the relay system, there is a capacity penalty. When providing a t1 packet delay, the capacity of the relay system would reduce to Cr which corresponds to a service with packet delay of t1−T. The capacity penalty ratio Kd=C/Cr, when Kd≧1. Overall capacity when the relay path provides a service with t1 delay is given by Kr*Cr. Therefore, the relay path should be selected when Kr*Cr>C or Kr/Kd>1, where Kr is the resource usage gain for a given mobile and Kd is the capacity penalty due to delay for that service, and when no other factor needs to be considered, e.g. loading of each node/path, handover penalties, etc. When other factors are also needed to be considered, the selection should be appropriately weighted by this factor to make the final decision.

If the required data rate can only be provided by the direct link, the direct link is used. Likewise, if only the relay link can provide a certain data rate for coverage enhancement, the mobile station 16 needs to be served by the relay. However, if a given service can be served by two paths, e.g. direct and relayed path, two situations exist. First, if the delay is not a concern, the path can be selected based on the minimum resource usage per data unit, which maximizes capacity or any other selected criterion, such as individual station loading. But, for delay sensitive data, additional delay incurred when relaying may impact the performance or the resource cost.

A path is selected based on the service requirement as well. Embodiments of the present invention provide path selection wherein several modes of operation are enabled, including dynamic path selection, semi-static path selection and static path selection for both delay tolerant data as well as delay sensitive data. For dynamic path selection, packets belonging to the same mobile station 16, and the same service can take different paths to/from base station 14 based on packet delay and size. For semi-static path selection, different data streams having different QoS, but belonging to the same mobile station 16, may use different paths to/from the base station 14 based on the service requirements. For static path selection, a mobile station 16 is assigned a path based on overall service requirements, i.e., two mobiles in the same location with different service requirements may use two different paths. For example, with delay tolerant data, the selection may be based only on effective data rates of two paths, e.g., capacity/coverage impact, mobility and system loading. However, for delay sensitive data, the overall best path is selected based on above factors, as well as the delay impact, and this path does not change.

The impact of delay may increase if the delay in the wireline section is high, which reduces the wireless delay budget. Even a small delay in the wireless network may impact the performance significantly.

With dynamic path selection, where packets belong to the same mobile station 16 and the same service can take different paths to/from base station 14 based on packet delay and size, for the downlink, the remaining delay budget of a packet depends on the delay already incurred in the wireline system, which is a variable. Therefore, depending on the remaining delay budget, the scheduler can decide to send the packet via direct or relay link, on a dynamic basis. For the uplink, if the wireline delay can be estimated using congestion data, this delay may be used to dynamically send data via direct or relay link.

Delay cost is mapped to the capacity cost as a linear relationship. Once delay cost is estimated, this cost may be used in any optimization algorithm involving many other factors such as system loading, individual data rate, system fairness, mobility, system capacity, priority and coverage.

The capacity cost may be calculated according to several methods, using many factors, such as, but not limited to, user priority. For example, capacity cost may be a function of mobility, system loading, fairness, delay, data rate. Alternatively, capacity cost may be a function of mobility, system loading, fairness, delay, multiplied by an effective data rate. Additionally, capacity cost may be a function of mobility, system loading, fairness, multiplied by a delay cost as well as an effective data rate. Calculating capacity cost considering mobility impact, system loading and fairness has already been discussed above.

In view of FIGS. 1, 2 and 3, a person of ordinary skill in the art is enabled to extend the techniques presented herein by induction to wireless systems which employ any number of relay stations, such as but not limited to wireless Mesh networks.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method of selecting a path for forwarding a data packet in a wireless communication system, the wireless communication system including at least one base station, at least one relay station and at least one mobile station, the method comprising:

calculating a system capacity versus delay impact curve for a direct path to a mobile station, the direct path having a first capacity cost determined according to a communication quality of a direct link between a base station and the mobile station;

shifting the system capacity versus delay impact curve by a predetermined time to produce a projected capacity curve for a relay path, the predetermined time corresponding to an additional delay over the relay path, the relay path including the at least one relay station and having a second capacity cost determined according to a combined measure of signal quality of multiple links in the relay path;

multiplying the second capacity cost by a capacity cost ratio to produce a relay capacity curve; and selecting one of the direct path and the relay path for forwarding the data packet, the path selection based on a comparison of the system capacity versus delay impact curve and the relay capacity curve at a point in the curves corresponding to a quality of service requirement of the data packet; and forwarding the data packet along the selected path.

2. The method of claim 1, wherein the path selection is further based on at least one of a required data rate, a type of service, user priority, mobility, system loading, fairness, and an effective data rate.

3. The method of claim 1, wherein the path selection is further based on a modified combined index based on at least one of a required data rate, a type of service, user priority, mobility, system loading, fairness, and an effective data rate, the modified combined index created by biasing the path selection in consideration of additional capacity cost and delay impact.

4. The method of claim 1, wherein the relay path is selected for the mobile station when a ratio of a resource usage gain for the mobile station and a capacity penalty is greater than 1.

5. The method of claim 1, wherein the path selection is one of a dynamic path selection, a semi-static path selection and a static path selection.

6. The method of claim 5, wherein the path selection is a dynamic path selection, the direct path and the relay path are dynamically selectable for forwarding the data packet corresponding to a same mobile station and having a same quality of service.

7. The method of claim 6, wherein the one of the direct path and the relay path is selected based on a traffic pattern and a quality of service requirement.

8. The method of claim 5, wherein the path selection is a semi-static path selection, the direct path and the relay path are dynamically selectable for forwarding the data packet corresponding to a same mobile station and having multiple service flows with differing qualities of service.

9. The method of claim 5, wherein the path selection is a static path selection, the one of the direct path and the relay path is selected based on an effective data rate of each path and a quality of service requirement.

10. An apparatus for selecting a path for forwarding a data packet in a wireless communication system, the wireless communication system including at least one base station, at least one relay station and at least one mobile station, the apparatus comprising:

a processor configured as a path selector to:

calculate a system capacity versus delay impact curve for a direct path to a mobile station, the direct path having a first capacity cost determined according to a communication quality of a direct link between a base station and the mobile station;

shift the system capacity versus delay impact curve a predetermined time to produce a projected capacity curve for a relay path, the predetermined time corresponding to an additional delay over the relay path, the relay path including the at least one relay station and having a second capacity cost determined according to a combined measure of signal quality of multiple links in the relay path;

multiply the second capacity cost by a capacity cost ratio to produce a relay capacity curve; and select one of the direct path and the relay path for forwarding the data packet, the path selection based on a comparison of the system capacity versus delay impact curve and the relay capacity curve at a point in the curves corresponding to a quality of service requirement of the data packet.

11. The apparatus of claim 10, wherein the path selection is further based on at least one of a required data rate, a type of service, user priority, mobility, system loading, fairness, and an effective data rate.

12. The apparatus of claim 10, wherein the path selection is further based on a modified combined index based on at least one of a required data rate, a type of service, user priority, mobility, fairness, and an effective data rate, the modified combined index created by biasing the path selection in consideration of additional capacity cost and delay impact.

13. The apparatus of claim 10, wherein the processor configured as a path selector also selects the relay path for the mobile station when a ratio of a resource usage gain for the mobile station and a capacity penalty is greater than 1.

14. The apparatus of claim 10, wherein the path selection is one of a dynamic path selection, a semi-static path selection and a static path selection.

15. The apparatus of claim 14, wherein the path selection is a dynamic path selection, the direct path and the relay path are dynamically selectable for forwarding the data packets corresponding to a same mobile station and having a same quality of service.

16. The apparatus of claim 15, wherein the one of the direct path and the relay path is selected based on a traffic pattern and a quality of service requirement.

17. The apparatus of claim 14, wherein the path selection is a semi-static path selection, the direct path and the relay path are dynamically selectable for forwarding data packets corresponding to a same mobile station and having multiple service flows with differing qualities of service.

18. The apparatus of claim 14, wherein the path selection is a static path selection, the one of the direct path and the relay path is selected based on an effective data rate of each path and a quality of service requirement.

19. A wireless communication system comprising:

at least one base station, the at least one base station including a path selector configured to:

calculate a system capacity versus delay impact curve for a first path to a mobile station, the first path having a first capacity cost determined according to a communication quality of a direct link between a base station and the mobile station;

shift the system capacity versus delay impact curve by a predetermined time to produce a projected capacity curve for a second path, the predetermined time corresponding to an additional delay over the second path, the second path having a second capacity cost determined according to a combined measure of signal quality of multiple links in the second path;

multiply the second capacity cost by a capacity cost ratio to produce a relay capacity curve; and select one of the first path and the second path for forwarding the data packet, the path selection based on a comparison of the system capacity versus delay impact curve and the relay capacity curve at a point in the curves corresponding to a quality of service requirement of the data packet;

at least one relay station communicatively coupled to the at least one base station; and at least one mobile station communicatively coupled to the at least one base station and the at least one relay station, the at least one mobile station configured to communicate with the at least one base station through at least two paths, a selected path of the at least two paths selected for forwarding a data packet based on a delay requirement of at least one of a service flow and the data packet.

* * * * *